(12) United States Patent
Hyatt et al.

(10) Patent No.: US 7,797,074 B2
(45) Date of Patent: Sep. 14, 2010

(54) MACHINE INCLUDING GRINDING WHEEL AND WHEEL DRESSER

(75) Inventors: Gregory Hyatt, South Barrington, IL (US); Abhijit Sahasrabudhe, Wheeling, IL (US)

(73) Assignee: Mori Seiki USA, Inc., Rolling Meadows, IL (US)

( * ) Notice: Subject to any disclaimer, the term of this patent is extended or adjusted under 35 U.S.C. 154(b) by 149 days.

(21) Appl. No.: 12/040,689

(22) Filed: Feb. 29, 2008

(65) Prior Publication Data

US 2008/0220697 A1    Sep. 11, 2008

Related U.S. Application Data

(60) Provisional application No. 60/892,492, filed on Mar. 1, 2007.

(51) Int. Cl.
*G06F 19/00* (2006.01)
*B24B 51/00* (2006.01)

(52) U.S. Cl. ...................................................... 700/164

(58) Field of Classification Search ................. 700/159, 700/160, 164, 169; 451/5, 21, 56, 72
See application file for complete search history.

(56) References Cited

U.S. PATENT DOCUMENTS

| | | | |
|---|---|---|---|
| 4,584,759 A * | 4/1986 | Bleich ........................... | 483/10 |
| 5,025,594 A * | 6/1991 | Lambert et al. ............... | 451/21 |
| 5,031,107 A * | 7/1991 | Suzuki et al. ................. | 700/186 |
| 5,042,206 A * | 8/1991 | Lambert et al. ............... | 451/21 |
| 5,044,125 A * | 9/1991 | Lambert et al. ............... | 451/72 |
| 5,045,664 A * | 9/1991 | Nakagawa et al. ........... | 219/69.2 |
| 5,060,164 A * | 10/1991 | Yoneda et al. ............... | 700/187 |
| 5,323,572 A * | 6/1994 | Guenin ......................... | 451/21 |
| 5,486,130 A * | 1/1996 | Kilmer, Sr. ................... | 451/11 |
| 5,857,896 A * | 1/1999 | Stollberg ...................... | 451/56 |
| 5,885,199 A * | 3/1999 | Shao ............................. | 483/19 |
| 6,123,606 A | 9/2000 | Hill et al. | |
| 6,666,748 B2 | 12/2003 | Hiramoto et al. | |
| 6,687,566 B2 * | 2/2004 | Nishimoto et al. ........... | 700/164 |
| 7,551,974 B2 * | 6/2009 | Wakazono .................... | 700/169 |

(Continued)

FOREIGN PATENT DOCUMENTS

DE    3437682    5/1985

(Continued)

OTHER PUBLICATIONS

International Search Report and the Written Opinion dated Jul. 21, 2008.

(Continued)

*Primary Examiner*—Charles R Kasenge
(74) *Attorney, Agent, or Firm*—Miller, Matthias & Hull (57) ABSTRACT

Disclosed are a machine with a grinding wheel and a dressing surface and related method. The dressing surface is movable in at least two axes of translation relative to the grinding wheel. The rotational speed of the grinding wheel and dressing surface preferably are under the control of a computer control system, whereby the speed of rotation of the dressing surface may be adjusted as the diameter of the dressing wheel and as the diameter of the grinding wheel is decreased during use. The machine may be used in continuous or intermittent dressing operations.

13 Claims, 12 Drawing Sheets

U.S. PATENT DOCUMENTS

2004/0074073 A1* 4/2004 Shingai et al. .................. 29/28
2006/0270538 A1 11/2006 Komizo

FOREIGN PATENT DOCUMENTS

DE 4430113 2/1996
DE 19940587 3/2001
WO 2008040106 4/2008

OTHER PUBLICATIONS

Machine Generated Abstract for article XP-1169396—"Hohere Produktivitat beim Schleifen".

International Preliminary Report on Patentability from PCT/US2008/055630 dated Sep. 1, 2009, 8 pages.

* cited by examiner

MACHINE INCLUDING GRINDING WHEEL AND WHEEL DRESSER

RELATED APPLICATION

This application claims the benefit of prior provisional application Ser. No. 60/892,492 filed Mar. 1, 2007. The entire contents of the prior provisional application are hereby incorporated by reference.

TECHNICAL FIELD OF THE INVENTION

The present invention is in the field of machine tools, and, in many embodiments, is in the field of computer numerically controlled machines and associated methods.

BACKGROUND OF THE INVENTION

Wheel dressing is an integral part of the grinding operation in a computer numerically controlled machine. During a grinding operation, the surface of the wheel may become distorted or clogged. In a dressing operation, the grinding wheel is dressed to expose a new grinding surface. Dressing is accomplished by engaging the grinding wheel with a wheel dresser.

Grinding wheels may be employed in conventional grinding operations or in so-called "viper" grinding. In viper grinding, a grinding wheel is applied at high speeds to a workpiece to cause a relatively high rate of material removal from the workpiece relative to the material removal rate of conventional grinding operations. Viper grinding is characterized most typically by employing a porous grinding wheel and a coolant nozzle that sprays coolant onto the grinding wheel at higher-than-typical coolant pressures. Conventional coolant pressures in a CNC machine are about 100 psi; in viper grinding, the pressure can be approximately 1000 psi. Viper grinding is discussed in more detail in U.S. Pat. No. 6,123,606, hereby incorporated by reference in its entirety for its disclosure of a grinding process.

In viper grinding operations, the grinding wheel is rapidly depleted. The volume of material removed from a workpiece may be compared to the volume of material removed from a grinding wheel in a measurement know as the G-ratio. Whereas, in conventional grinding operations, a G-ratio of approximately 100:1 is typical, viper grinding operations often run at a G-ratio of around 4:1. Accordingly, dressing typically is required at more frequent intervals than in conventional grinding operations.

Conventional CNC machines employ a stationary wheel dresser. The conventional arrangement is effective for dressing the grinding wheel, but can make for a time-consuming dressing operation. This is particularly the case in connection with viper grinding operations, where dressing is required frequently. Efforts have heretofore been made to address the foregoing shortcoming. U.S. Pat. No. 6,666,748, assigned to Makino Milling Machines Company, Ltd., purports to disclose a machining center that includes a specially designed dressing tool disposed over the spindle head of the machining center. This dressing tool is said to assist in automating a dressing process.

The present invention seeks, in some embodiments, to provide a machine, and in other embodiments, a method, that differs from the heretofore described conventional arrangement and from the apparatus and method described in U.S. Pat. No. 6,666,748.

SUMMARY

A machine includes, in one embodiment, a grinding wheel and a wheel dresser, the wheel dresser being movable relative to a base of a machine and movable in at least two axes of translation relative to the grinding wheel. For instance, the wheel dresser may be disposed on a turret of the machine, the turret being movable in X- and Z-directions. In some embodiments the turret may be movable in X-, Y-, and Z-directions.

In other embodiments, a method for dressing a grinding wheel is provided. The method comprises providing an apparatus that includes a dressing surface movable in at least two linear axes relative to the grinding wheel, and moving the grinding wheel relative to the dressing surface to cause the grinding wheel to contact the dressing surface to enable dressing of the grinding wheel. The dressing may be continuous dressing or intermittent dressing.

The ability to move the dressing wheel in at least two axes of translation relative to the grinding wheel affords a number of advantages. In some embodiments, plural dressing surfaces may be provided, each dressing surface corresponding to a desired surface profile of the grinding wheel. One of the wheel dressers may be moved into and out of engagement with the grinding wheel, and a second one of the wheel dressers may be moved into and out of engagement with the same or a different grinding wheel. In many embodiments, the speed of rotation of one or both of the wheel dresser and grinding wheel are adjustable under the control of a computer control system, whereby the speed of the wheel dresser may be adjusted as a diameter of the grinding wheel is reduced in use.

BRIEF DESCRIPTION OF THE FIGURES

The figures are not intended to be scale figures.

DETAILED DESCRIPTION

Any suitable apparatus may be employed in conjunction with the methods of invention. In some embodiments, the methods are performed using a computer numerically controlled machine, illustrated generally in FIGS. 1-9. A computer numerically controlled machine is itself provided in other embodiments of the invention. The machine 100 illustrated in FIGS. 1-9 is an NT-series machine, versions of which are available from Mori Seiki USA, Inc., the assignee of the present application. Other suitable computer numerically controlled machines include the NL-series machines with turret (not shown), also available from Mori Seiki USA, Inc.

Other machines may be used in conjunction with the invention, including the NZ, NH, NV, and NMV machines, also available from Mori Seiki USA, Inc.

Figure 1:
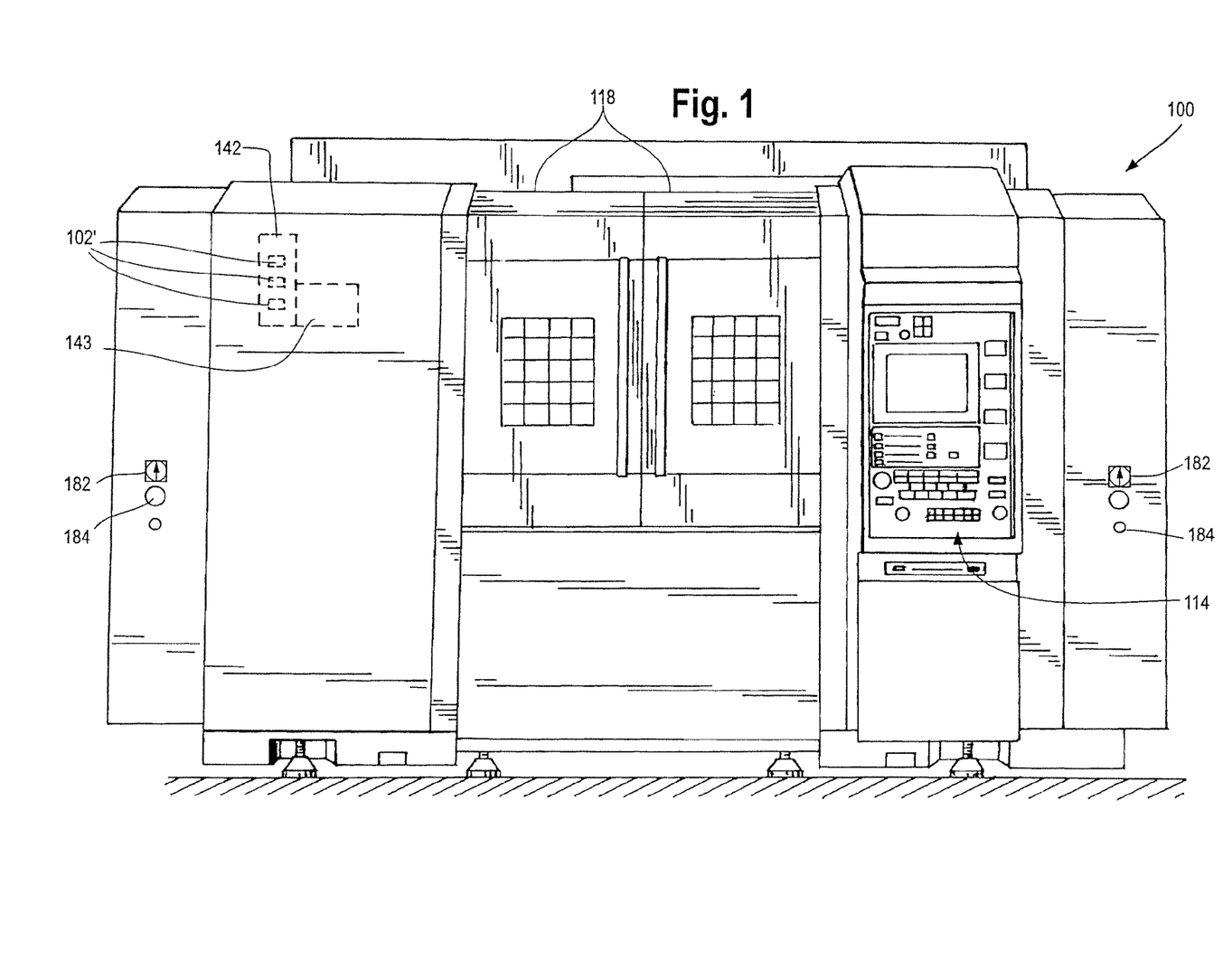
FIG. 1 is a front elevation view of a computer numerically controlled machine in accordance with one embodiment of the present invention, shown with safety doors closed.
Figure 2:
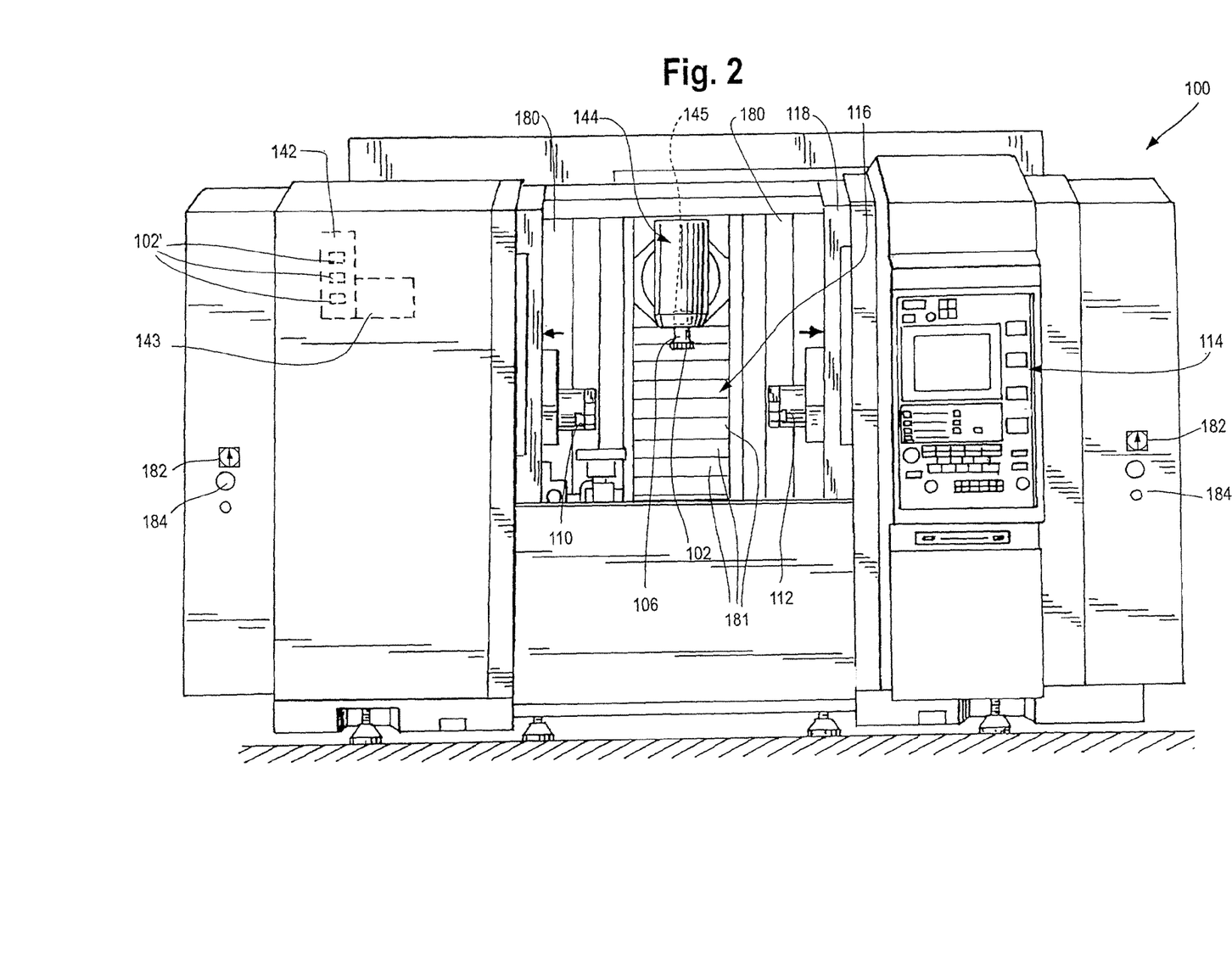
FIG. 2 is a front elevation view of a computer numerically controlled machine illustrated in FIG. 1, shown with the safety doors open.
Figure 3:
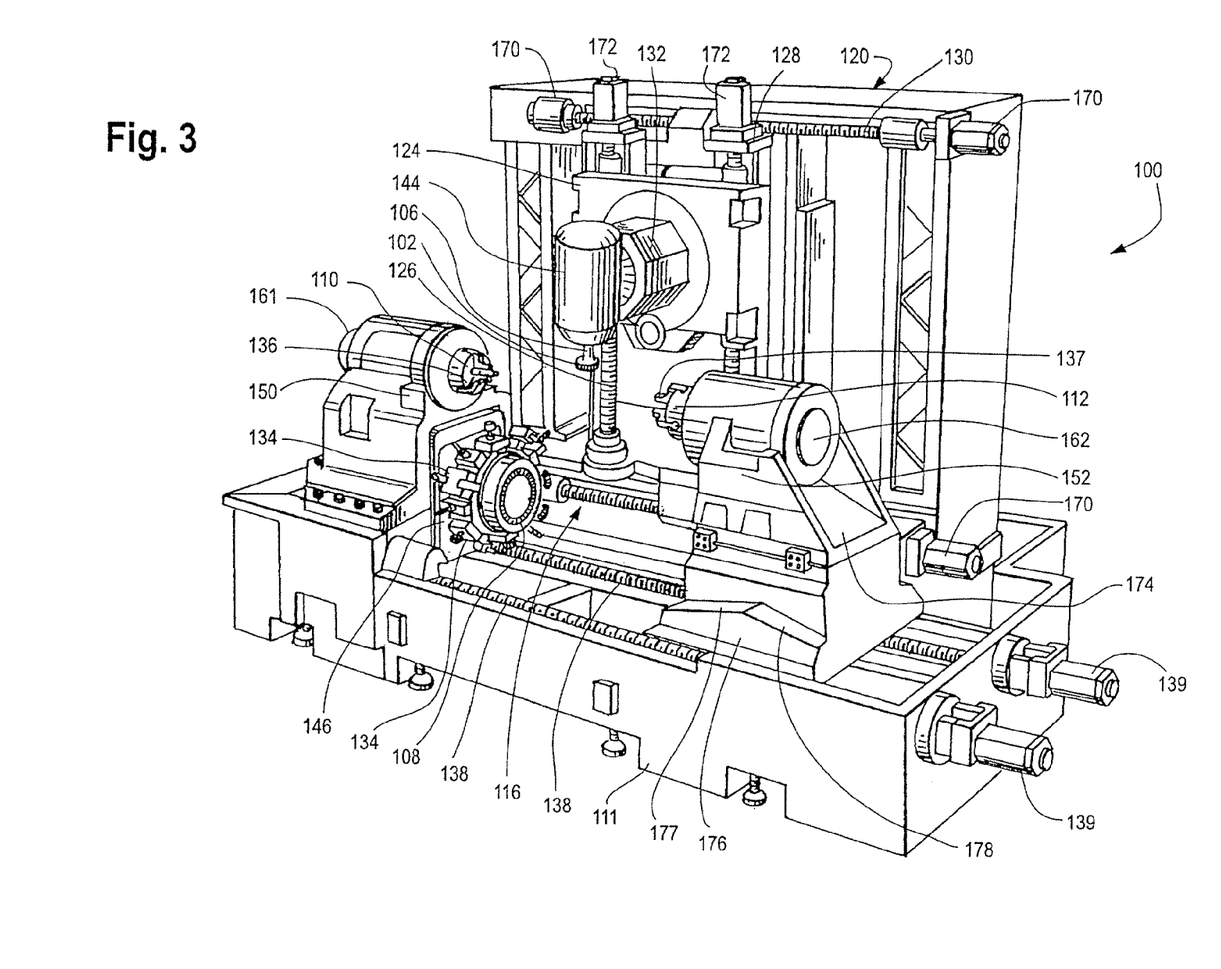
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be one of a spindle retainer associated with spindle 144, a turret retainer associated with a turret 108, or a chuck 110, 112. In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system. In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically computer controlled machine 100 may have a tool magazine 142 and a tool changing device 143. These cooperate with the spindle 144 to permit the spindle to operate with plural cutting tools (shown in FIG. 1 as tools 102'). Generally, a variety of cutting tools may be provided; in some embodiments, plural tools of the same type may be provided.

The spindle 144 is mounted on a carriage assembly 120 that allows for translational movement along the X- and Z-axes, and on a ram 132 that allows the spindle 144 to be moved in the Y-axis. The ram 132 is equipped with a motor to allow rotation of the spindle in the B-axis, as set forth in more detail hereinbelow. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the cutting tool 102 by way of a spindle connection and a tool holder 106. The spindle connection 145 (shown in FIG. 2) is connected to the spindle 144 and is contained within the spindle 144. The tool holder 106 is connected to the spindle connection 145 and holds the cutting tool 102. Various types of spindle connections are known in the art and can be used with the computer numerically controlled machine 100. Typically, the spindle connection 145 is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 100. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
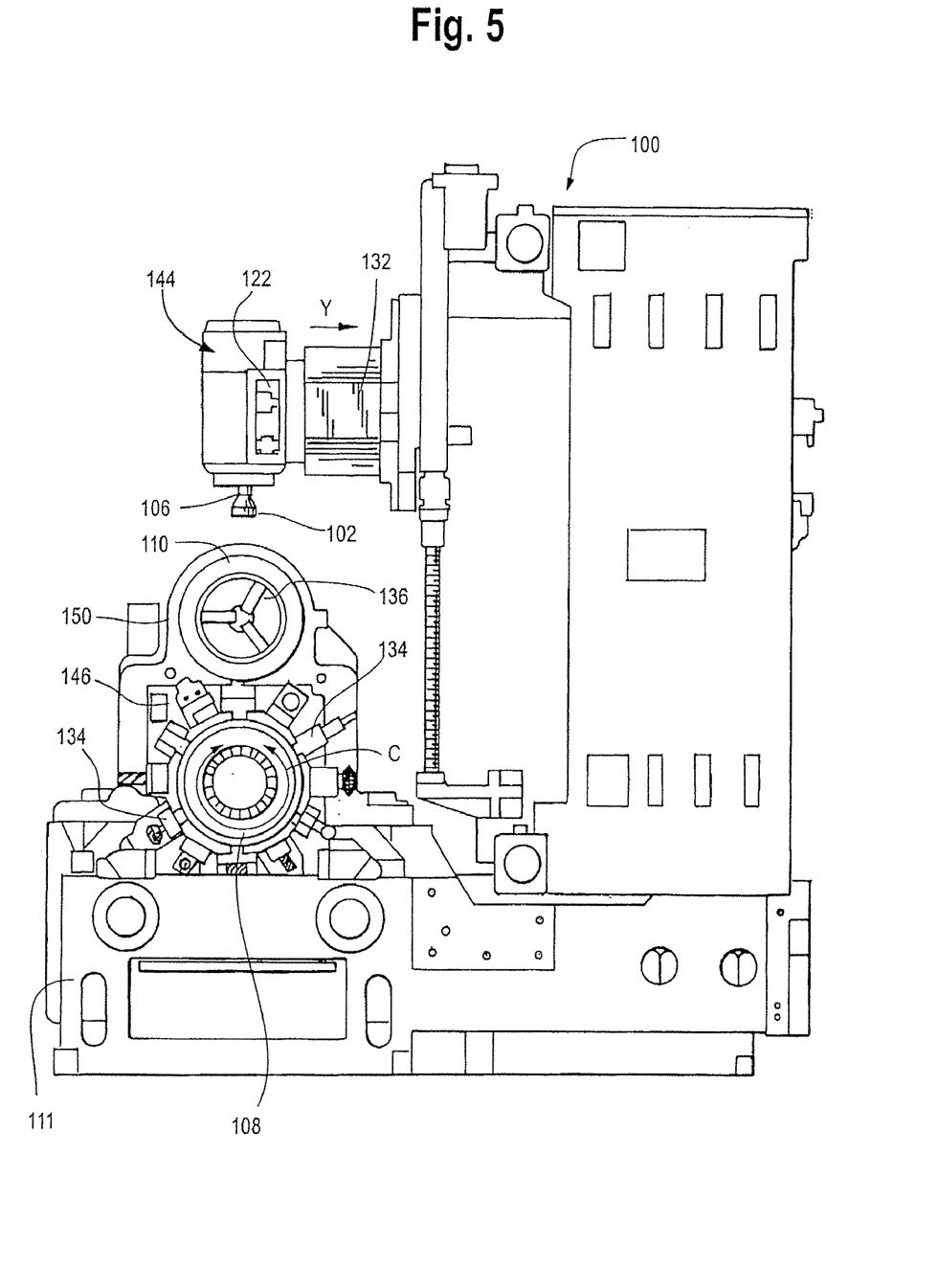
FIG. 5 is a side view of the first chuck, machining spindle, and turret of the machining center illustrated in FIG. 1.
Figure 6:
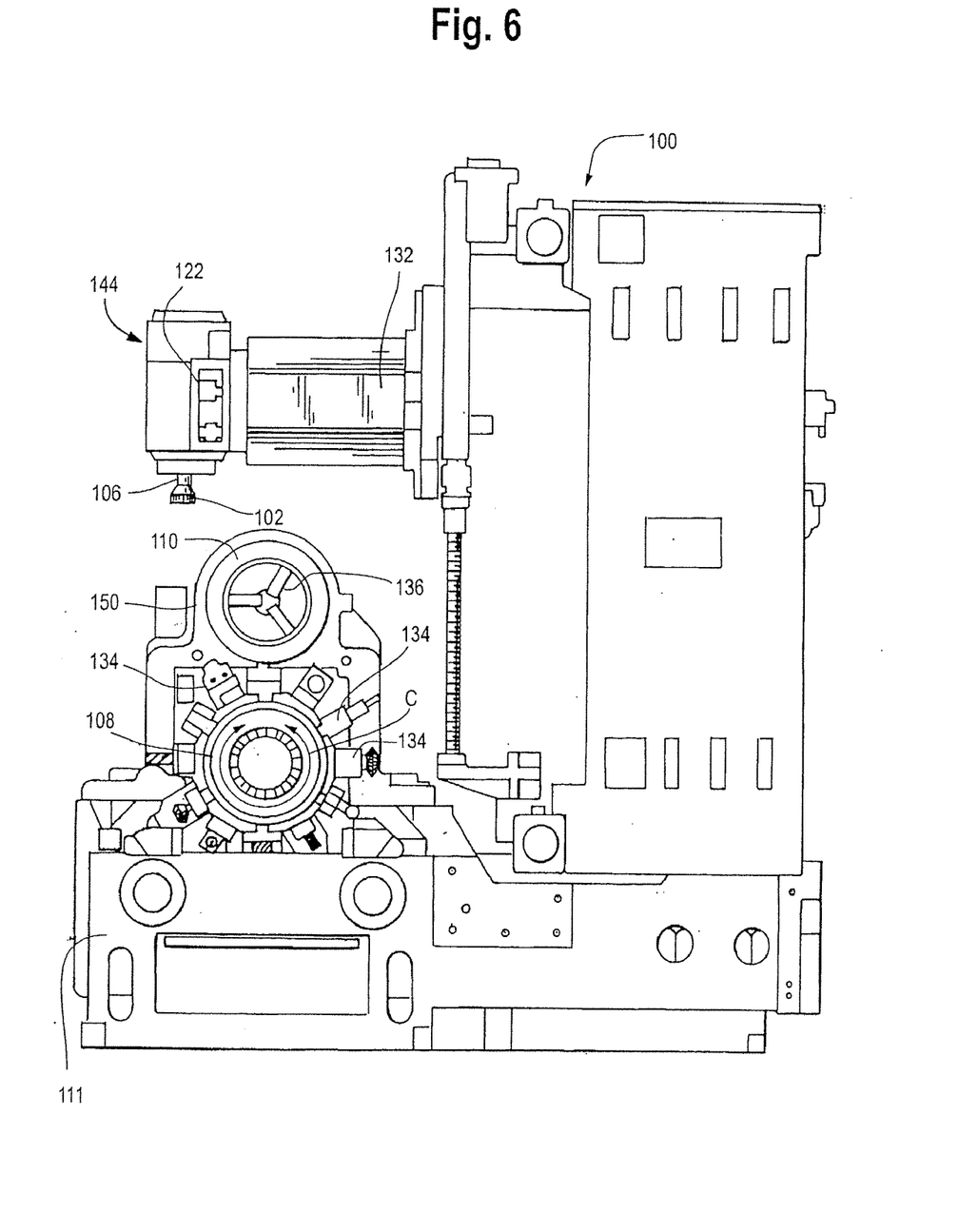
FIG. 6 is a view similar to FIG. 5 but in which a machining spindle has been translated in the Y-axis.
Figure 9:
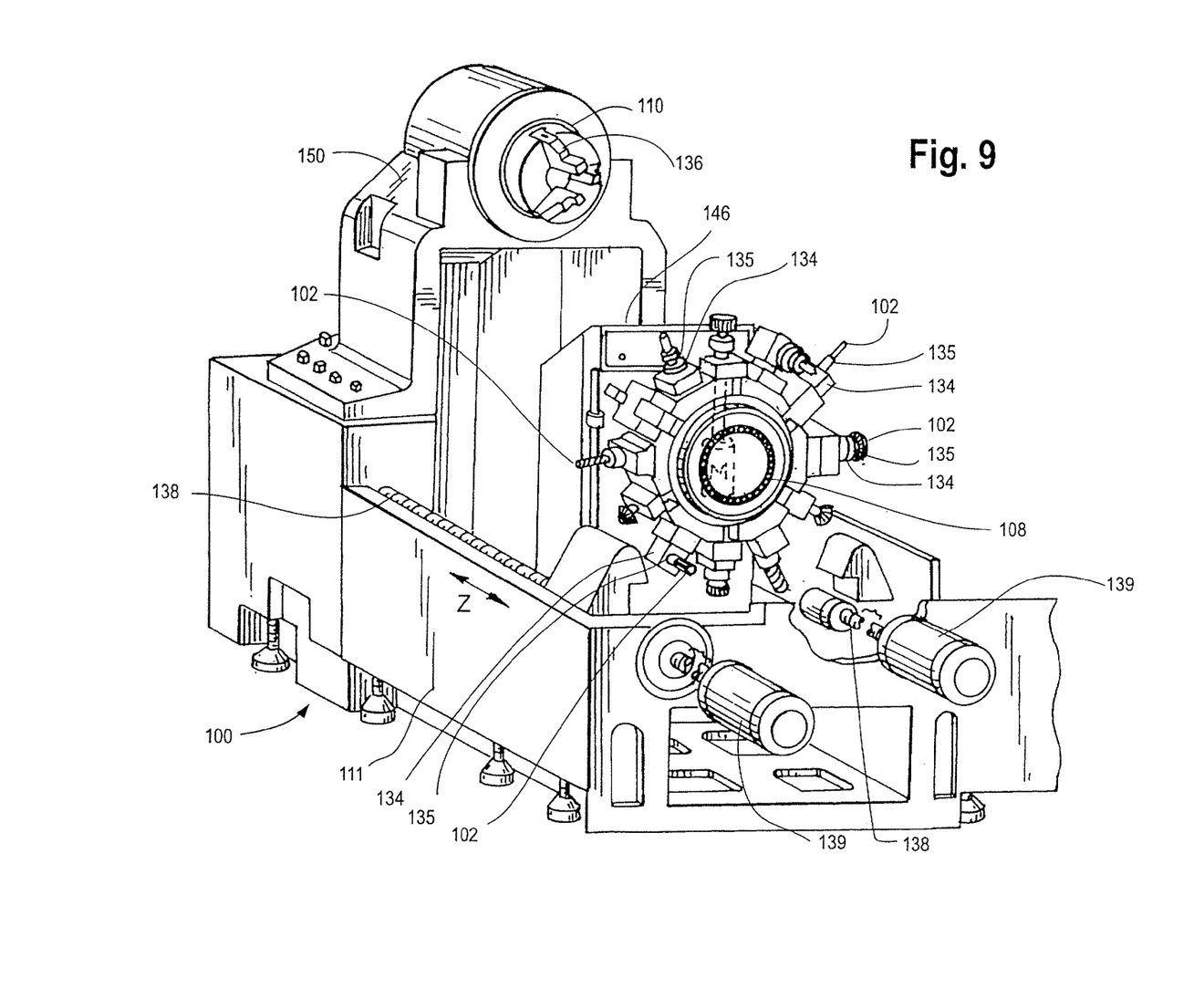
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool holder 135 or other connection for connecting to a cutting tool. Since the turret 108 can have a variety of turret connectors 134 and tool holders 135, a variety of different cutting tools can be held and operated by the turret 108. The turret 108 may be rotated in a C axis to present different ones of the tool holders (and hence, in many embodiments, different tools) to a workpiece.

Figure 4:
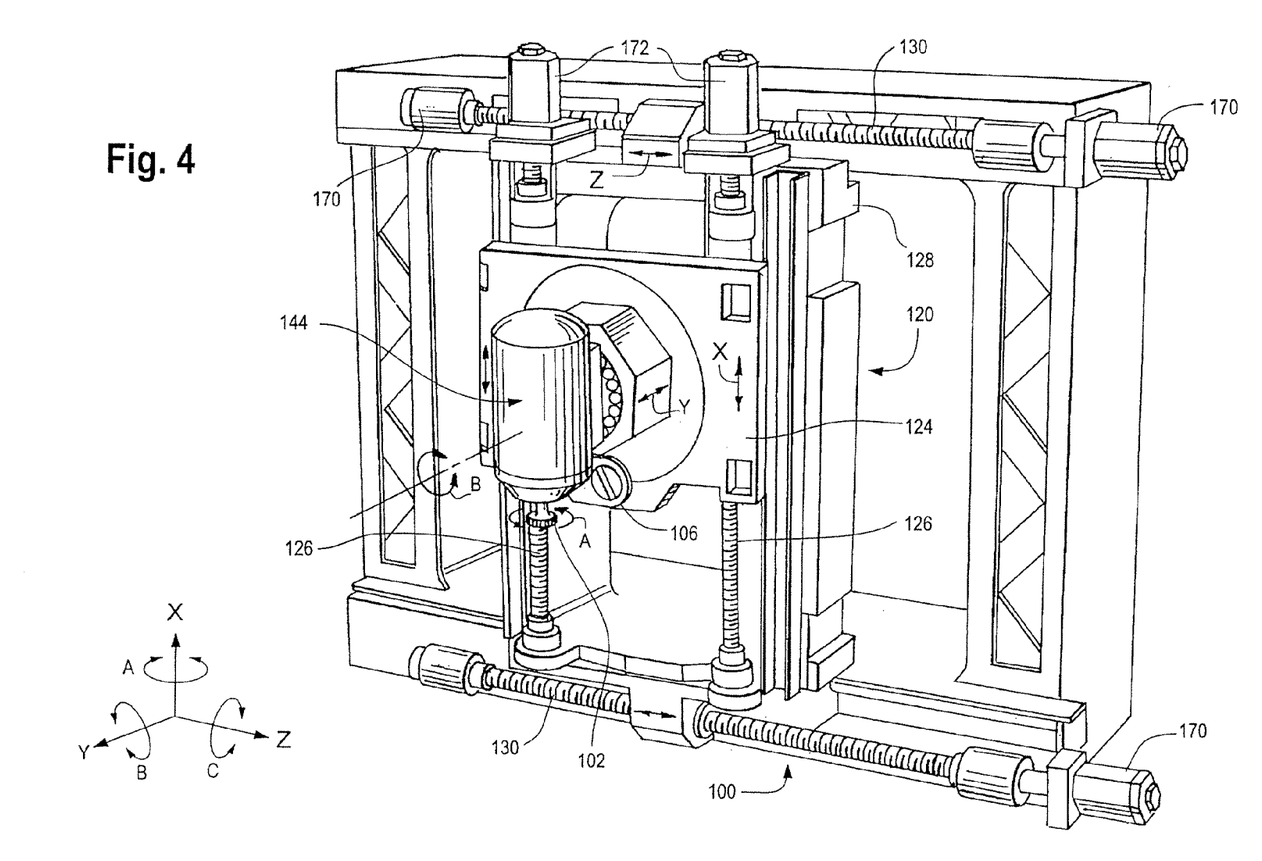
FIG. 4 a perspective view, enlarged with respect to FIG. 3 illustrating the machining spindle and the horizontally and vertically disposed rails via which the spindle may be translated.
Figure 7:
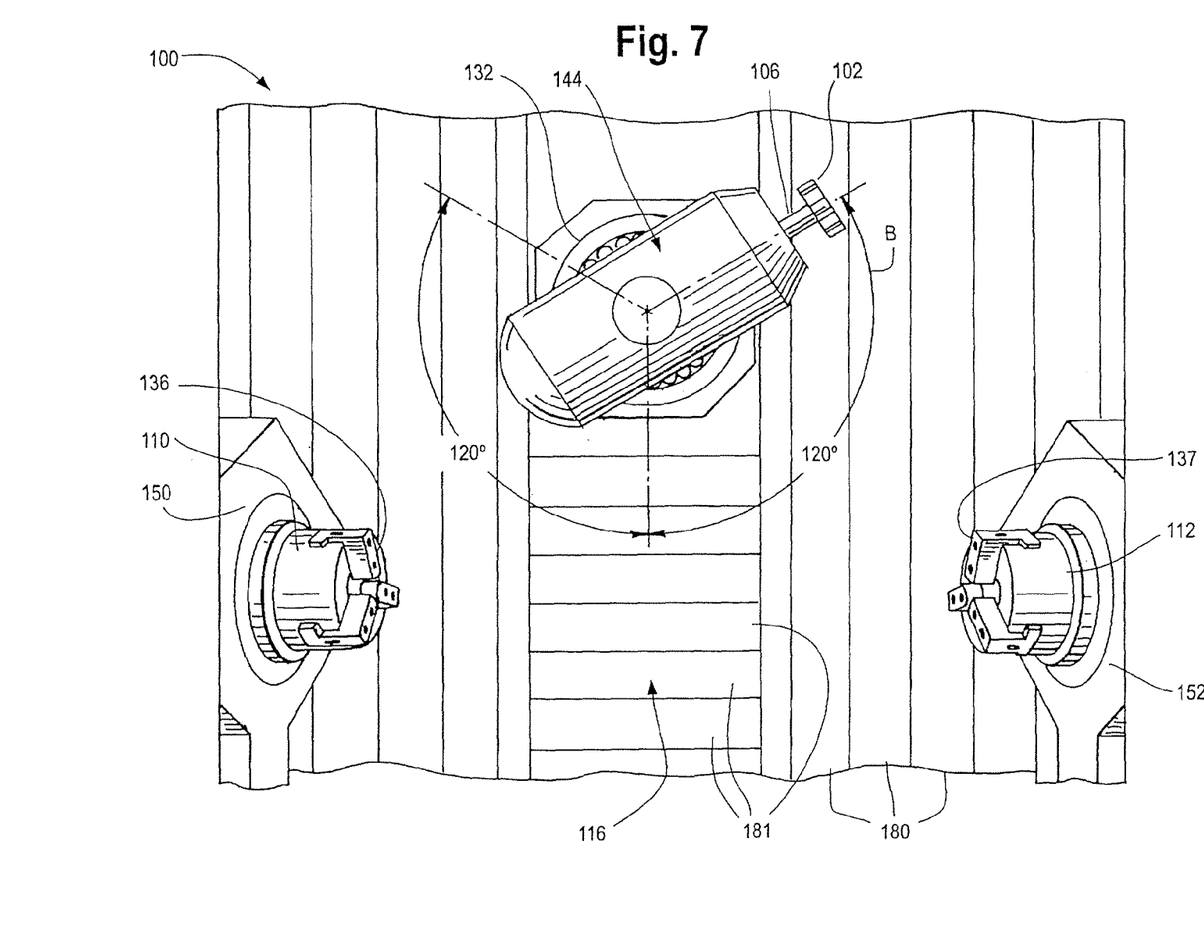
FIG. 7 is a front view of the spindle, first chuck, and second chuck of the computer numerically controlled machine illustrated in FIG. 1, including a line depicting the permitted path of rotational movement of this spindle.
Figure 8:
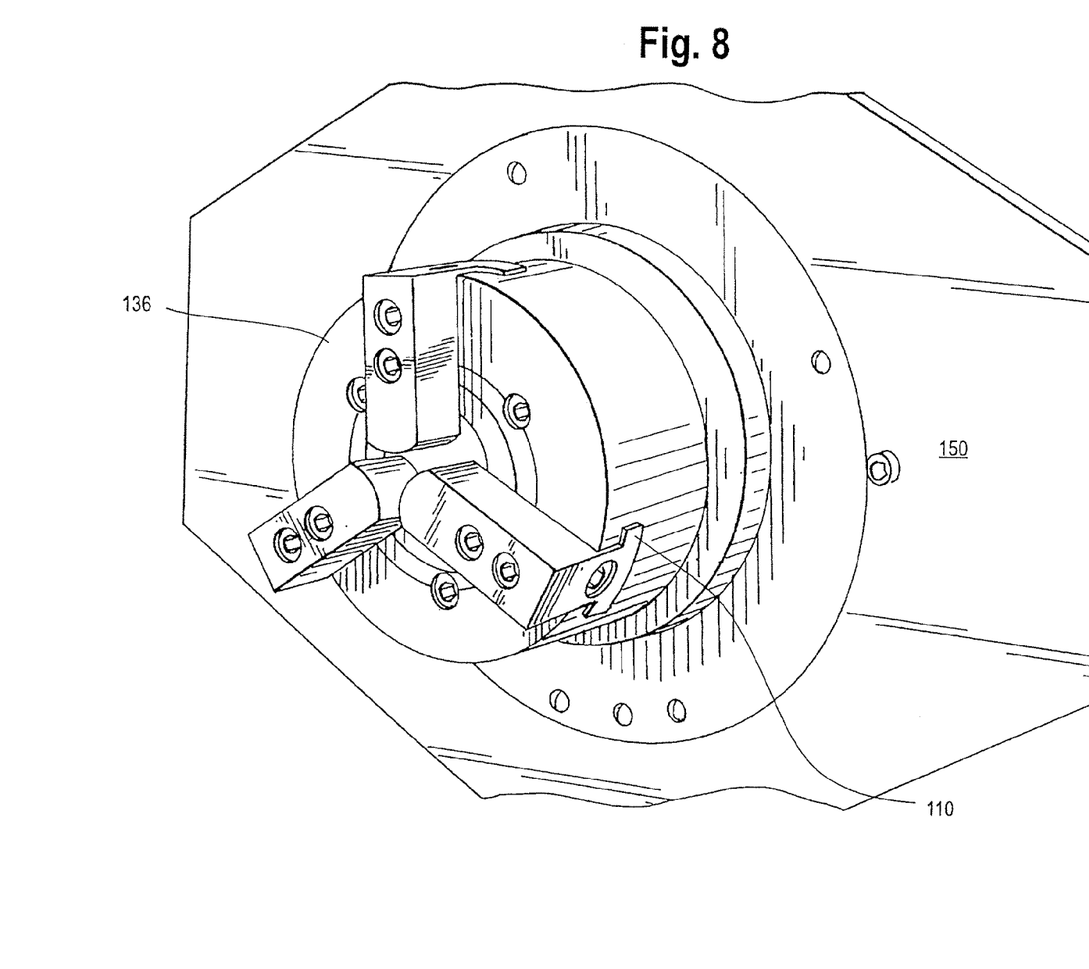
FIG. 8 is a perspective view of the second chuck illustrated in FIG. 3, enlarged with respect to FIG. 3.

It is thus seen that a wide range of versatile operations may be performed. With reference to tool 102 held in tool holder 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120° to either side of the vertical. Movement in the Y direction and rotation in the B axis are powered by motors (not shown) that are located behind the carriage 124. Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of cutting tools known in the art or otherwise found to be suitable. For instance, the cutting tool 102 may be a milling tool, a drilling tool, a grinding tool, a blade tool, a broaching tool, a turning tool, or any other type of cutting tool deemed appropriate in connection with a computer numerically controlled machine 100. As discussed above, the computer numerically controlled machine 100 may be provided with more than one type of cutting tool, and via the mechanisms of the tool changing device 143 and magazine 142, the spindle 144 may be caused to exchange one tool for another. Similarly, the turret 108 may be provided with one or more cutting tools 102, and the operator may switch between cutting tools 102 by causing rotation of the turret 108 to bring a new turret connector 134 into the appropriate position.

Other features of a computer numerically controlled machine include, for instance, an air blower for clearance and removal of chips, various cameras, tool calibrating devices, probes, probe receivers, and lighting features. The computer numerically controlled machine illustrated in FIGS. 1-9 is not the only machine of the invention, but to the contrary, other embodiments are envisioned.

A machine as described above may be used in connection with a grinding wheel 202 and a wheel dresser. The grinding wheel 202 may be a disc-shaped object with a uniform circular cross-section, but it is contemplated that other such wheels may be employed. Many grinding wheels are generally circular but have a shaped edge profile, and many wheels have a non-cylindrical form (for example some are frustoconical). It is contemplated that a cross section of the grinding wheel need not be circular.

Figure 12:
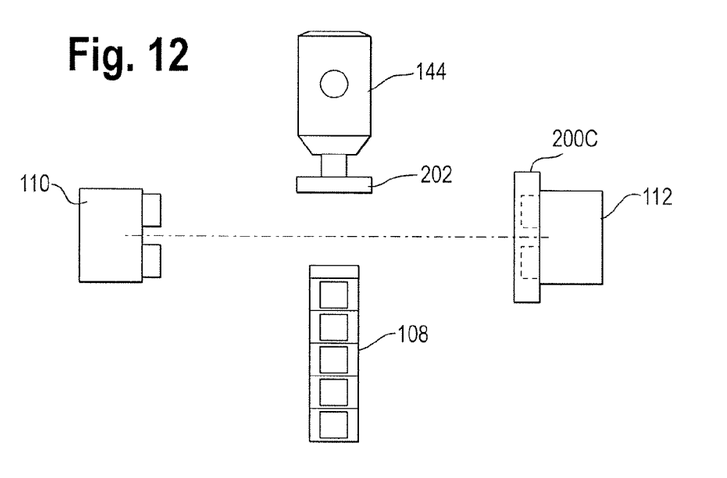
FIG. 12 is a front view of the computer numerically controlled machine shown in FIG. 1, illustrating a grinding wheel disposed on the upper spindle and a dressing wheel concentric about the second turret.

A typical dresser includes an abrasive material, such as diamond grit, electroplated or otherwise deposited on a rotary roll. It should be understood, however, that other forms are within the purview of the invention. Similarly, the wheel dresser ordinarily has a generally annular or cylindrical configuration, but other forms are possible. As shown, for instance, in FIG. 12, the wheel dresser 200C may take an annular form and may be disposed concentrically about the second chuck 112.

Figure 10:
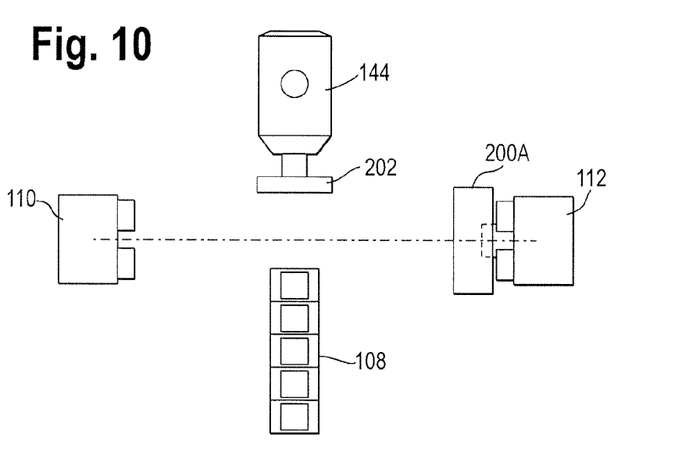
FIG. 10 is front view of the computer numerically controlled machine illustrated in FIG. 1, shown with a dressing wheel disposed in the second chuck and a grinding wheel disposed in the spindle.

With reference to FIG. 10, the wheel dresser, which in the illustrated embodiment takes the form of dressing wheel 200A, is disposed on the second chuck 112 of the machine, and is movable with respect to a base of the machine. The grinding wheel 202 is disposed on the spindle 144. By virtue of the ability to move the spindle 144 relative to the chuck 112, the wheel dresser 200A is movable in plural axes relative to grinding wheel 202.

Figure 11:
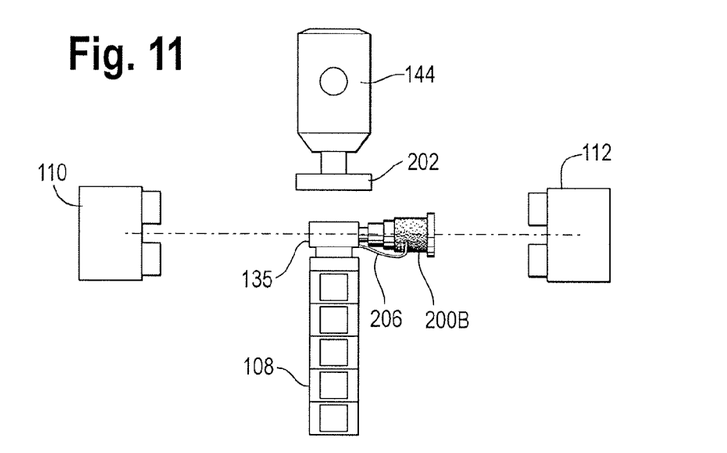
FIG. 11 is a front view of the computer numerically controlled machine shown in FIG. 1, shown with a grinding wheel in the upper spindle and a dressing wheel disposed on the turret.

In the embodiment shown in FIG. 11, the dressing wheel 200B is disposed on the turret 108, with the grinding wheel 202 disposed on the spindle 144. As illustrated, the dressing wheel 200B is disposed in a turret holder 135. The turret holder 135 is equipped with a coolant nozzle 206 for communicating fluid from a fluid reservoir under pressure. The turret 108 is movable in the X- and Z-axes, and the tool dresser 200B thus is movable in two translational axes relative to the grinding wheel 202.

In the illustrated embodiment, the grinding wheel 202 has a Y-axis component, and thus in this embodiment, the tool dresser 200B is movable in a third axis of translation relative to the grinding wheel 202. It is contemplated in some embodiments that the turret 1098 itself may have a Y-axis component of motion.

As illustrated, the coolant nozzle 206 is shown as fixed relative to the turret 108. In some embodiments of the invention, the coolant nozzle 206 may be a nozzle described in co-pending application Ser. No. 12/040,602, entitled Machine Tool With Cooling Nozzle and Method for Applying Cooling Fluid, which application is hereby incorporated by reference in its entirety.

As heretofore described, the turret 108 is rotatable to expose different facets or connections 134 to a functional position. Typically, there is only one functional position per turret 108, but it is conceivable that a turret may have multiple functional positions. In the functional position, the turret retainer 135 is connected to a motor that is either internal or external to the turret 108 and that is operatively connected to the computer control system, thus enabling the item retained in the holder 135 to rotate under the control of the operator. In many cases coolant may be selectively introduced through the turret 108. In accordance with the illustrated subject matter, under the control of the control system, rotation of the dresser wheel is enabled and movement of the dressing wheel relative to the grinding wheel is permitted. Under the control of the computer control system, the grinding wheel may be brought a position of engagement with respect to the dresser for dressing of the grinding wheel.

Typically, both the wheel dresser and the grinding wheel rotate in a dressing operation. In other embodiments, the grinding wheel may be driven and may rotate while the dresser remains stationary. In still other embodiments, the dresser is not driven but is caused to rotate based on friction between the grinding wheel and dresser (this arrangement termed a "brake dresser"). In other embodiments, the dresser may be driven and rotate as the grinding wheel remains stationary. It is contemplated that the grinding wheel may be caused to rotate via friction.

Figure 13:
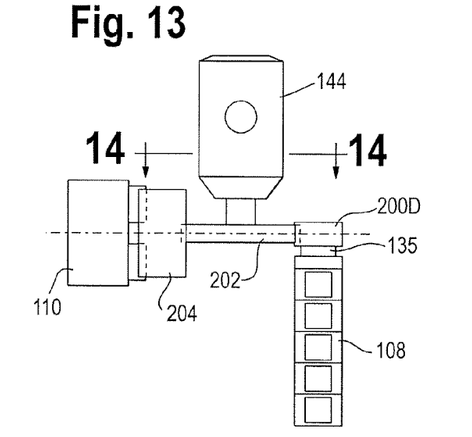
FIG. 13 is a front view of the computer numerically controlled machine illustrating one embodiment of a continuous grinding operation.

In a continuous dressing operation, as shown in FIG. 13, the grinding wheel 202 contacts the workpiece 204 at the same time as the wheel dresser 200D contacts the grinding wheel 202. "Continuous" operation does not necessarily connote operation in which the dressing wheel is always in contact with the grinding; rather, it is sufficient that there is simultaneous contact between the grinding wheel 202 and workpiece 204, and grinding wheel 202 and wheel dresser 200D. In some embodiments, the grinding operation is always continuous; that is, the dressing wheel contacts the grinding wheel at essentially all times during the grinding operation within the limits of the ability of the machine to control the operation.

Figure 14:
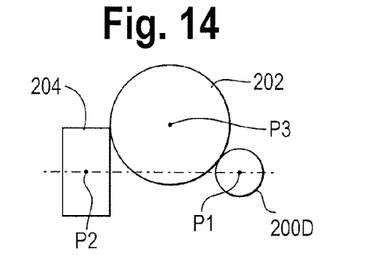
FIG. 14 is a representation of the dressing wheel, grinding wheel, and workpiece of the computer numerically controlled machine shown in FIG. 13.
Figure 15:
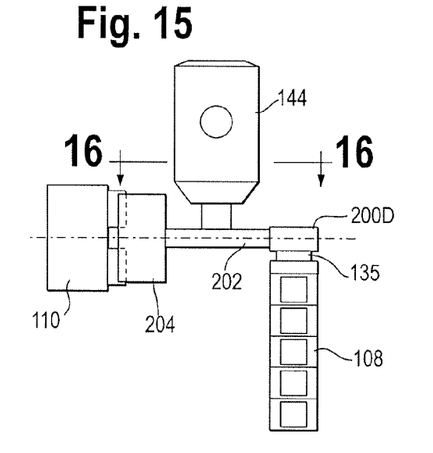
FIG. 15 is a front view of the computer numerically controlled machine illustrating a second continuous grinding operation.
Figure 16:
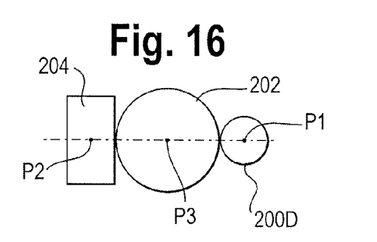
FIG. 16 is a representation of the dressing wheel, grinding wheel, and workpiece of the computer numerically controlled machine shown in FIG. 15.

As seen in FIG. 14, the positions P1, P2 of the dressing wheel 200D and workpiece 204, respectively, may be offset relative to a central point P3 of the grinding wheel 202. As shown in FIGS. 15 and 16, other configurations are possible, and in the illustrated embodiment, the centers P1, P2, P3 of the dressing wheel 200D, workpiece 204, and grinding wheel 202, respectively, are coaxial. The relative positioning of these components may be selected by the machine operator or may be dictated by the geometry of the workpiece 204 or grinding wheel 202. Continuous operation is maintained by X and Z motion of the dressing wheel 200D used in the machine turret 208 and by X, Y and Z axis motion of the grinding wheel 202.

Figure 17:
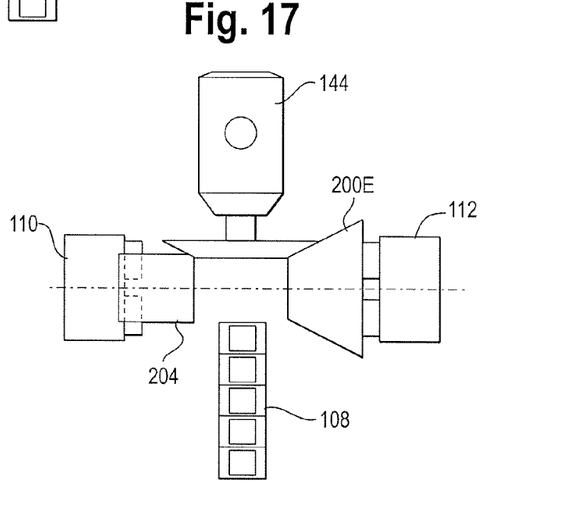
FIG. 17 is a front view of the computer numerically controlled machine illustrating a third continuous dressing operation.

In another form of continuous operation, as shown in FIG. 17, the dresser 200E is disposed on chuck 112. In this embodiment, continuous operation is maintained by Z-axis motion of the dressing wheel 200E and by X-, Y- and Z-motion of the grinding wheel 202.

Figure 18:
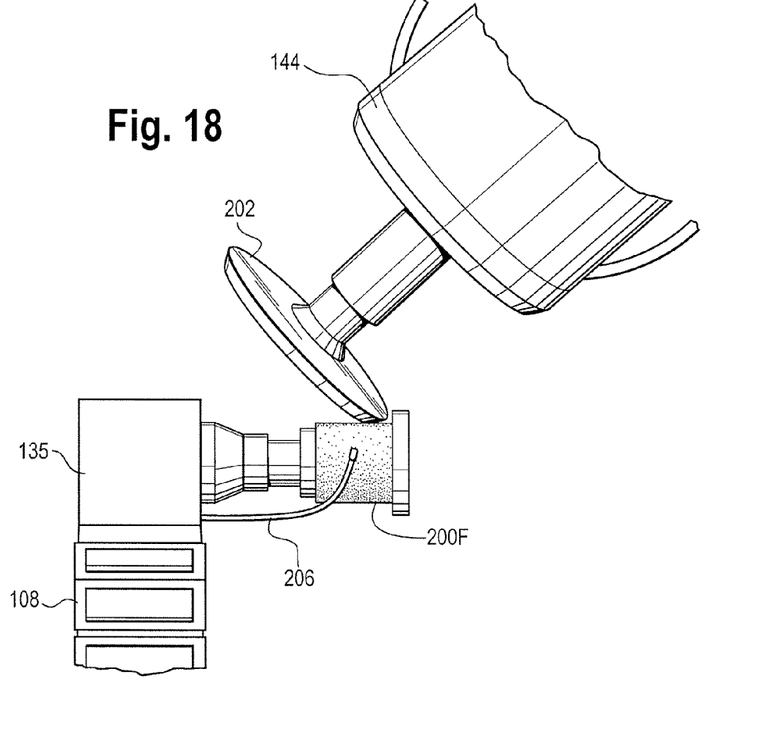
FIG. 18 is a front view of the computer numerically controlled machine illustrating an embodiment of an intermittent grinding operation.

FIG. 18 illustrates one of many conceivable intermittent dressing operations. By "intermittent" is contemplated that the grinding wheel 202 is not in contact with the dresser 200F, while the grinding wheel 202 is in contact with the workpiece, and the grinding wheel 202 is not in contact with the workpiece while in contact with the dresser 200F. Some operations may employ both continuous and intermittent dressing.

Figure 19A:
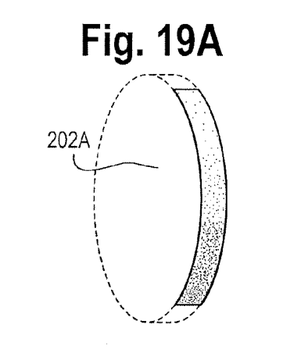
FIG. 19A through 19C are perspective views of different grinding wheel useful in connection with grinding operations in a computer numerically controlled machine.
Figure 19B:
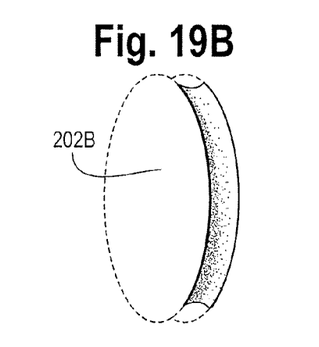
Figure 19C:
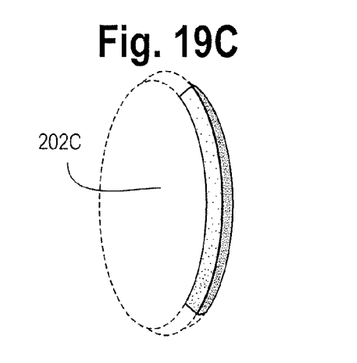
Figure 20:
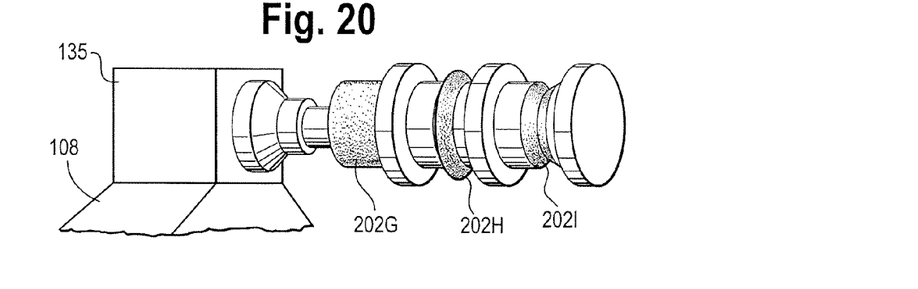
FIG. 20 is a side view of a turret illustrating plural sequentially disposed wheel dressers.

As shown in FIGS. 19A-C, a grinding wheel may have different edge configurations (three embodiments 202A, 202B, 202C are shown, but many additional configurations are possible). Each grinding wheel 202A, 202B, 202C may have a unique wheel dresser configuration, and, in some embodiments, grinding wheels composed of different materials may require dressing using different wheel dressers. To accommodate the foregoing, the wheel dressers may be disposed sequentially in one of the holders in the machine, as illustrated, for instance, in FIG. 20 with the three dressers 200G, 200H, and 200I disposed sequentially in the turret holder 135. In the illustrated embodiment, the wheel dressers 200G, 200H, 200I are coaxial. Other configurations are possible, and the dressers may be disposed sequentially non-coaxially in any configuration desired. One or more dressers may be disposed at a 90 degree angle with respect to the other dressers or machine, or aligned with a machine axis, or at an oblique angle. It is conceivable that the same grinding wheel may be dressed using different dressers in a grinding operation, and it is conceivable that different grinding wheels may be dressed using one or more of the plural dressers. A machine may be supplied with plural grinding wheels, which may be disposed in a tool magazine 142 of the machine and retrieved by the spindle 144 when in use. In some embodiments, it is contemplated that a machine may be equipped with plural wheel dressers which likewise may be disposed in the tool holder and retrieved by the tool spindle.

The machine may be used with suitable gap elimination systems. Conventional gap elimination systems are configured to detect the engagement of surfaces in a machine by techniques such as detecting an increase in vibration or power consumption. In accordance with the present invention, the computer control system may employ a gap elimination system to detect engagement of the grinding wheel and dresser, of the grinding wheel and workpiece, or both.

Additionally, the speed of rotation of one or both of the wheel dresser and grinding wheel are adjustable under the control of the computer control system, whereby the speed of the wheel dresser may be adjusted as a diameter of the grinding wheel is reduced in use, to accommodate such reduction of diameter.

It is thus seen that an apparatus and method for dressing a grinding wheel are provided.

All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention.

The invention claimed is:

1. An apparatus comprising:
   a stationary base,
   a first holder configured to retain a grinding wheel and a second holder configured to retain a wheel dresser, said first and second holders each being one of a chuck, a spindle retainer, and a turret retainer,
   a third holder configured to retain a workpiece and being immovable with respect to said base,
   said first and second holders being movable with respect to said base and each being movable in at least two axes of translation relative to said third holder, and
   a computer control system operatively coupled to said first holder and to said second holder and including a computer readable medium having disposed thereon code which, when executed, is configured to cause movement of said first holder and said second holder to simultaneously perform a dressing operation causing said wheel dresser to engage said grinding wheel for dressing of said grinding wheel and a grinding operation causing said grinding wheel to engage said workpiece for grinding said workpiece.

2. An apparatus according to claim 1, including a grinding wheel disposed in said first holder and a wheel dresser disposed in said second holder.

3. An apparatus according to claim 1, said wheel dresser being mounted on a turret movable at least in X and Z axes.

4. An apparatus according to claim 3, said grinding wheel being mounted on a spindle.

5. An apparatus according to claim 1, said computer control system being configured to control the rotational speed of said grinding wheel and said wheel dresser, said code, when executed, permitting adjustment of the rotational speed of said dresser to accommodate reduction in size of said grinding wheel.

6. An apparatus according to claim 1, said apparatus including plural wheel dressers disposed sequentially in said second holder.

7. A method comprising:
   providing an apparatus that comprises:
      a stationary base,
      a first holder configured to retain a grinding wheel and a second holder configured to retain a wheel dresser, said first and second holders each being one of a chuck, a spindle retainer, and a turret retainer,
      a third holder configured to retain a workpiece and being immovable with respect to said base,
      said first and second holders being movable with respect to said base and each being movable in at least two axes of translation relative to said third holder, and
      a computer control system operatively coupled to said first holder and to said second holder and including a computer readable medium having disposed thereon code which, when executed, is configured to cause movement of said first holder and said second holder to simultaneously perform a dressing operation of causing said wheel dresser to engage said grinding wheel for dressing of said grinding wheel and a grinding operation of causing said grinding wheel to engage said workpiece for grinding said workpiece; and
   under the control of said computer control system, moving said first holder and said second holder relative to said third holder to simultaneously perform the grinding operation and the dressing operation.

8. A method according to claim 7, said wheel dresser being mounted on a turret movable at least in X and Z axes.

9. A method according to claim 8, said grinding wheel being mounted on a spindle.

10. A method according to claim 7, comprising controlling the rotational speed of one or both of said grinding wheel and said wheel dresser to accommodate reduction in size of said grinding wheel using said computer control system.

11. A method according to claim 7, said apparatus including plural wheel dressers disposed sequentially on said second holder, the method comprising causing the grinding wheel to engage one of said wheel dressers.

12. A method according to claim 11, the method comprising providing a second grinding wheel and causing said second grinding wheel to engage a second one of said wheel dressers.

13. A method according to claim 7, said dresser not being driven.

* * * * *